(12) United States Patent
Chen

(10) Patent No.: US 10,655,573 B2
(45) Date of Patent: May 19, 2020

(54) ENVIRONMENTALLY FRIENDLY ENERGY SAVING DEVICE

(71) Applicant: HONG JIE SHENG INTERNATIONAL CO., LTD., Taichung (TW)

(72) Inventor: Po-Hui Chen, Changhua County (TW)

(73) Assignee: HONG JIE SHENG INTERNATIONAL CO., LTD., Taichung (TW)

( * ) Notice: Subject to any disclaimer, the term of this patent is extended or adjusted under 35 U.S.C. 154(b) by 0 days.

(21) Appl. No.: 16/667,923

(22) Filed: Oct. 30, 2019

(65) Prior Publication Data

US 2020/0063698 A1 Feb. 27, 2020

Related U.S. Application Data

(63) Continuation-in-part of application No. 15/972,229, filed on May 7, 2018.

(30) Foreign Application Priority Data

Jun. 27, 2017 (TW) .............................. 106121353 A

(51) Int. Cl.
- *F02M 27/00* (2006.01)
- *F02M 27/06* (2006.01)
- *F16L 9/02* (2006.01)

(52) U.S. Cl.
CPC ............... *F02M 27/06* (2013.01); *F16L 9/02* (2013.01)

(58) Field of Classification Search
CPC ....... F02M 27/06; F02M 31/005; F02M 31/14

USPC ......................................................... 123/538
See application file for complete search history.

(56) References Cited

U.S. PATENT DOCUMENTS

| 5,044,346 A | * | 9/1991 | Tada | ....................... | F02B 51/06 123/536 |
| 2004/0139731 A1 | * | 7/2004 | Chiu | ...................... | F02M 27/00 60/275 |
| 2005/0241626 A1 | * | 11/2005 | Hashimoto | ............ | C10G 32/02 123/538 |
| 2008/0098996 A1 | * | 5/2008 | Fujii | ...................... | F02M 27/04 123/536 |

(Continued)

FOREIGN PATENT DOCUMENTS

TW 584168 B1 4/2004

*Primary Examiner* — Long T Tran
*Assistant Examiner* — James J Kim
(74) *Attorney, Agent, or Firm* — Bruce Stone LLP; Joseph A. Bruce

(57) ABSTRACT

An environmentally friendly energy saving device includes a hollow metal inner pipe inserted in a hollow metal outer pipe, and the inner pipe includes: a middle portion defining a receiving chamber with respect to the hollow metal outer pipe, two connecting portions located at two ends of the middle portion and extended out from two ends of the hollow metal outer pipe, and a thinning groove formed in the middle portion and in communication with the receiving chamber. Far infrared powder are filled into the receiving chamber and the thinning groove and pressurized into a block. Two ends of the receiving chamber are sealed. By thinning the part of the outer wall of the inner pipe that is connected to the receiving chamber, the energy-saving efficiency of the environmentally friendly energy saving device is improved.

5 Claims, 5 Drawing Sheets

(56) References Cited

U.S. PATENT DOCUMENTS

2014/0216589 A1* 8/2014 Liu ...................... F02M 27/065
138/109

* cited by examiner

ENVIRONMENTALLY FRIENDLY ENERGY SAVING DEVICE

This application is a continuation in part of U.S. patent application Ser. No. 15/972,229 which claims the benefit of the earlier filing date of May 7, 2018.

BACKGROUND

Field of the Invention

The present invention relates to an environmentally friendly energy saving device.

Related Prior Art

As shown in FIG. 1, a titanium plated environmentally friendly energy saving device 100 disclosed in the Taiwan Patent No. 584168 includes a hollow titanium plated outer pipe 10, a hollow titanium plated inner pipe 11 extending from the center of the hollow titanium plated outer pipe 10, and a space 13 defined between the hollow titanium plated outer and inner pipes 10, 11 and filled with far infrared powder 131. Two covers 12 are disposed at two ends of the hollow titanium plated outer pipe 10 to close the space 13, and the hollow titanium plated inner pipe 11 has two connecting ends 14 extended from the two ends of the hollow titanium plated outer pipe 10 and connected between fuel hoses. Gasoline can be atomized by the far infrared powder 131 when flowing into the hollow titanium plated inner pipe 11. The hollow titanium plated outer and inner pipes 10, 11 are coated with titanium to have positive and negative ions, so that the gasoline ions which are in the form of turbulent in the fuel hoses can be recombined by the tendency of ionization. Meanwhile, the hollow titanium plated outer and inner pipes 10, 11 can effectively conduct heat, which allows the gasoline to be heated evenly and vaporized completely. Besides, the far infrared powder 131 is used to improve reaction effect, and the far infrared powder 131 is filled in the space 13 between the hollow titanium plated outer and inner pipes 10, 11 to enhance the heat preservation effect.

When the titanium plated environmentally friendly energy saving device 100 is in use, the far infrared powder 131 in the space 13 can emit far infrared rays capable of penetrating the hollow titanium plated inner pipe 11, so that the molecular bond of gasoline in fuel passage 15 is elongated to increase the surface tension of gasoline, thus atomizing the gasoline. Because the penetration rate of the far infrared ray produced by the far infrared powder 131 is related to the wall thickness of the hollow titanium plated inner pipe 11, the thicker the thickness is, the lower the penetration rate will be, and vice versa. Therefore, in order to improve the energy saving efficiency of the titanium plated environmentally friendly energy saving device 100, a solution that can be taken is to thin the part of the wall of the hollow titanium plated inner pipe 11 that is connected to the space 13. However, a problem will arise as a result, that is, when gasoline flows to the fuel passage 15, because of the high fuel pressure, especially when the titanium plated environmentally friendly energy saving device 100 is used in the high pressure common rail engine, the fuel pressure generated by the fuel pressure is too high, and as a result, the thinned pipe wall cannot withstand this fuel pressure and may burst. Therefore, the invention is aimed at providing a titanium plated environmentally friendly energy saving device 100 which can improve the infrared ray penetration rate and won't be broken.

SUMMARY

One objective of the present invention is to provide an environmentally friendly energy saving device capable of improving the efficiency of energy saving.

To achieve the above objective, an environmentally friendly energy saving device in accordance with the invention comprises: a hollow metal outer pipe, a hollow metal inner pipe, a reaction unit and two covers.

The hollow metal inner pipe is inserted in the hollow metal outer pipe, and includes: a middle portion defining a receiving chamber with respect to the hollow metal outer pipe, two connecting portions located at two ends of the middle portion and extended out from two ends of the hollow metal outer pipe, and a thinning groove formed in the middle portion and in communication with the receiving chamber, wherein the hollow metal inner pipe includes a fuel channel running through the two connecting portions for passage of fuel.

The reaction unit is formed by filling far infrared powder into the receiving chamber and the thinning groove and pressurizing the far infrared powder into a block, wherein the reaction unit includes a first reaction portion located in the receiving chamber, and a second reaction portion located in the thinning groove.

The two covers are disposed at two ends of the hollow metal outer pipe to seal off two ends of the receiving chamber, and the two connecting portions of the hollow metal inner pipe extend out of the two covers, respectively.

The beneficial effect of the present invention is that, when the environmentally friendly energy saving device is in use, the thinning of the pipe wall of the hollow metal inner pipe greatly alleviates the barrier that weakens the far infrared rays emitted by the far infrared powder to improve the penetrability of the far infrared rays, allowing gasoline molecules to absorb more far infrared rays, thus improving the energy saving efficiency. Besides, in particular, the far-infrared powder is pressurized into a block with the first and second reaction portions to support the thin pipe wall, thus preventing the overly thin pipe wall from breaking under fuel pressure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
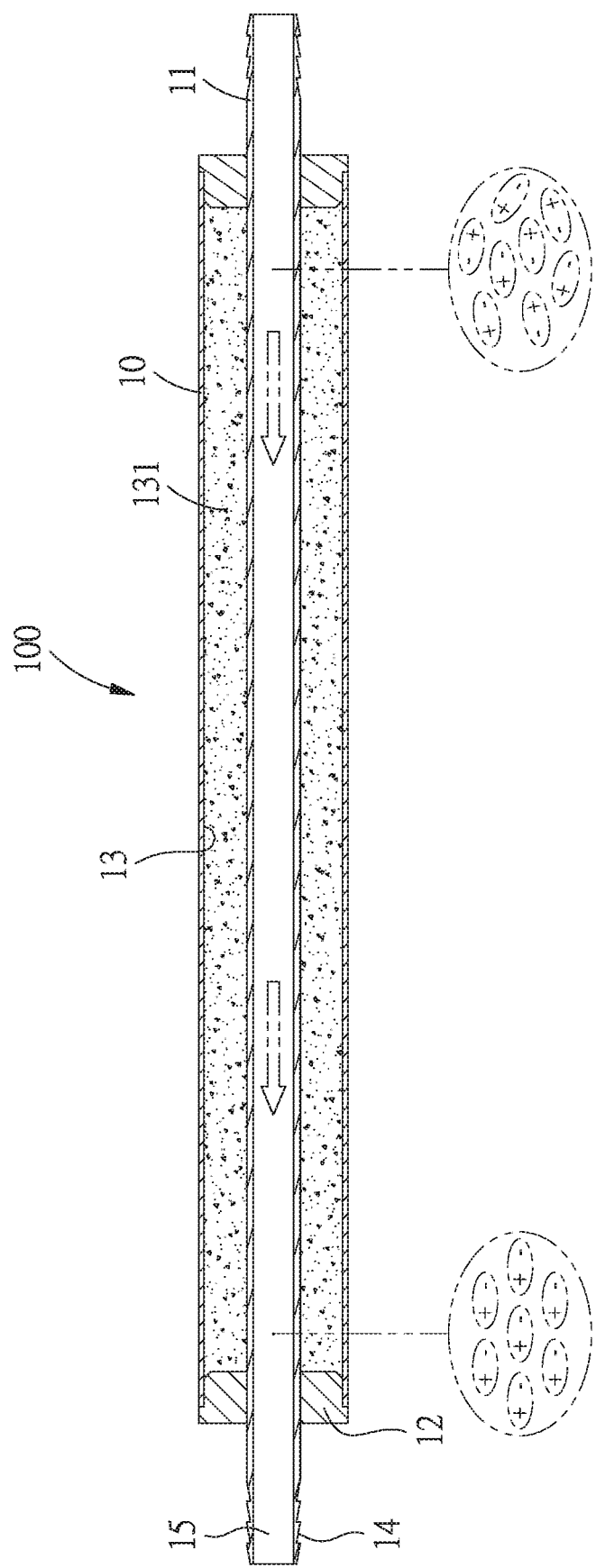
FIG. 1 is a cross sectional view of a conventional environmentally friendly energy saving device.
Figure 2:
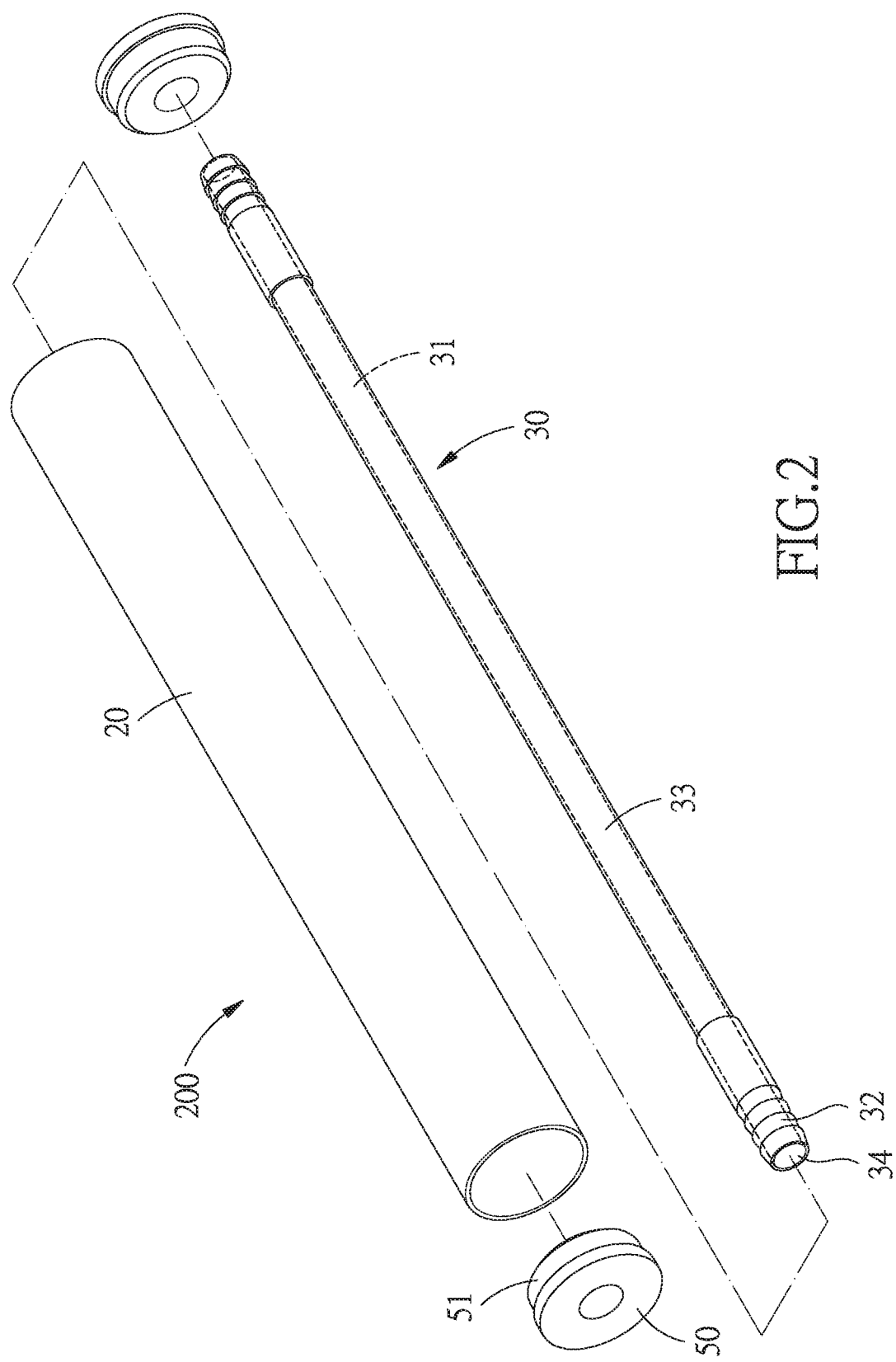
FIG. 2 is an exploded view of the environmentally friendly energy saving device in accordance with a preferred embodiment of the invention.

The present invention will be clearer from the following description when viewed together with the accompanying drawings, which show, for purpose of illustrations only, the preferred embodiment in accordance with the present invention.

Referring to FIGS. 2-5, an environmentally friendly energy saving device 200 in accordance with the invention comprises: a hollow metal outer pipe 20, a hollow metal inner pipe 30, a reaction unit 40 and two covers 50.

The hollow metal outer pipe 20 is a seamless stainless steel pipe. This embodiment is a titanium plated metal pipe, for example.

The hollow metal inner pipe 30 is a seamless stainless steel pipe. This embodiment is a titanium plated metal pipe, for example. The hollow metal inner pipe 30 is inserted in the hollow metal outer pipe 20, and includes a middle portion 31 defining a receiving chamber 60 with respect to the hollow metal outer pipe 20, two connecting portions 32 located at two ends of the middle portion 31 and extended out from two ends of the hollow metal outer pipe 20, and a thinning groove 33 formed in the middle portion 31 and in communication with the receiving chamber 60. The connecting portions 32 take the form of annular ratchet teeth. The depth of the thinning groove 33 is between 0.2 mm and 0.5 mm, and is 0.2 mm in this embodiment. The hollow metal inner pipe 30 has a fuel channel 34 running through the two connecting portions 32 for passage of fuel.

The reaction unit 40 is formed by filling far infrared powder 41 into the receiving chamber 60 and the thinning groove 33 and pressurizing the far infrared powder 41 into a block. The reaction unit 40 includes: a first reaction portion 42 located in the receiving chamber 60, and a second reaction portion 43 located in the thinning groove 33.

The two covers 50 are disposed at two ends of the hollow metal outer pipe 20 to seal off two ends of the receiving chamber 60, and the connecting portions 32 of the hollow metal inner pipe 30 extend out of the two covers 50. Each of the two covers 50 includes a circular chamfer 51 located in the receiving chamber 60 and adjacent to the hollow metal outer pipe 20.

Figure 3:
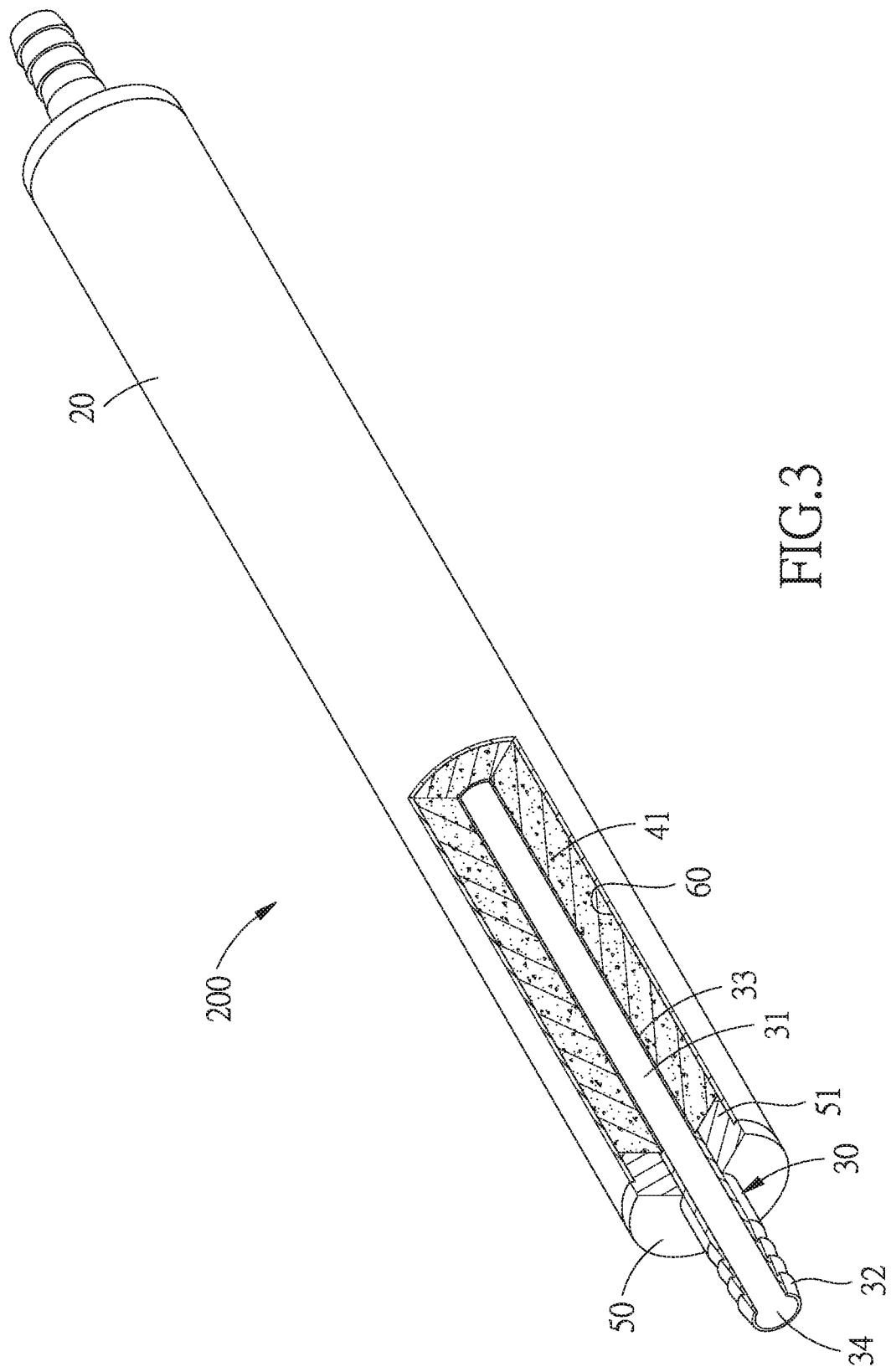
FIG. 3 is a partial cross sectional view showing the assembly of the components shown in FIG. 2.
Figure 4:
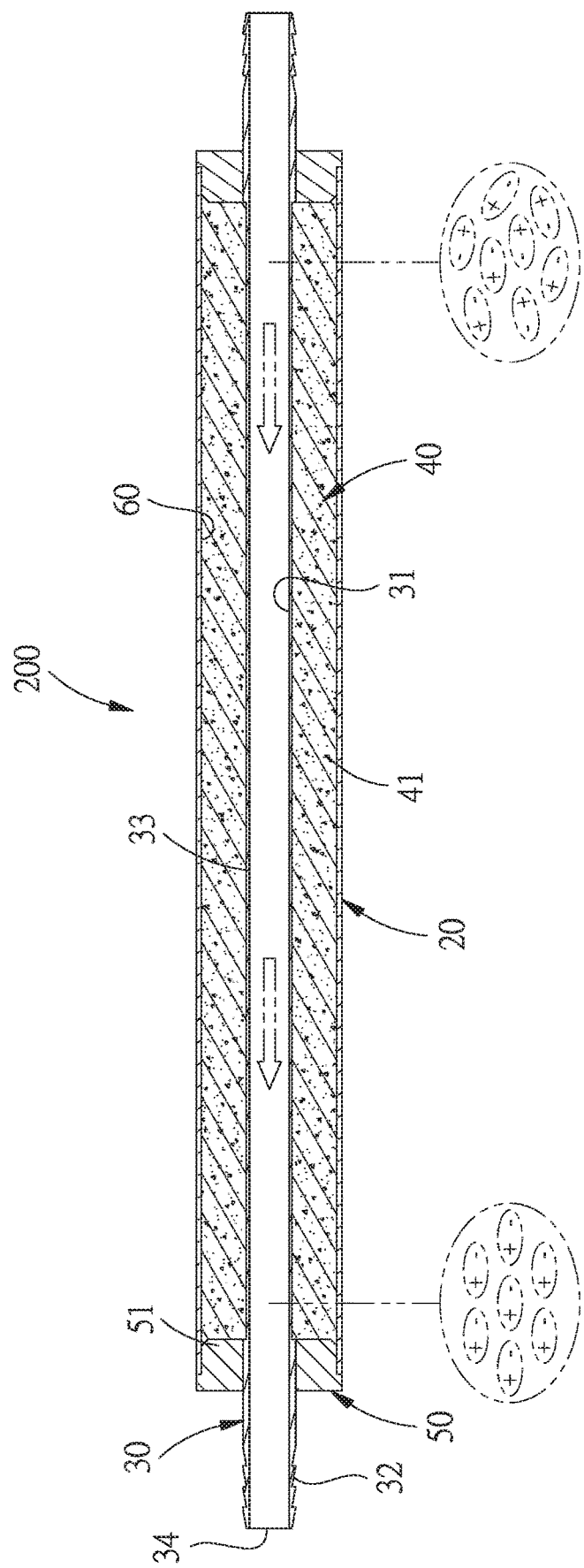
FIG. 4 is an operational cross sectional view showing the state of the reaction unit, when the environmentally friendly energy saving device of the invention is in use and the gasoline flows to the fuel passage of the hollow metal inner pipe.
Figure 5:
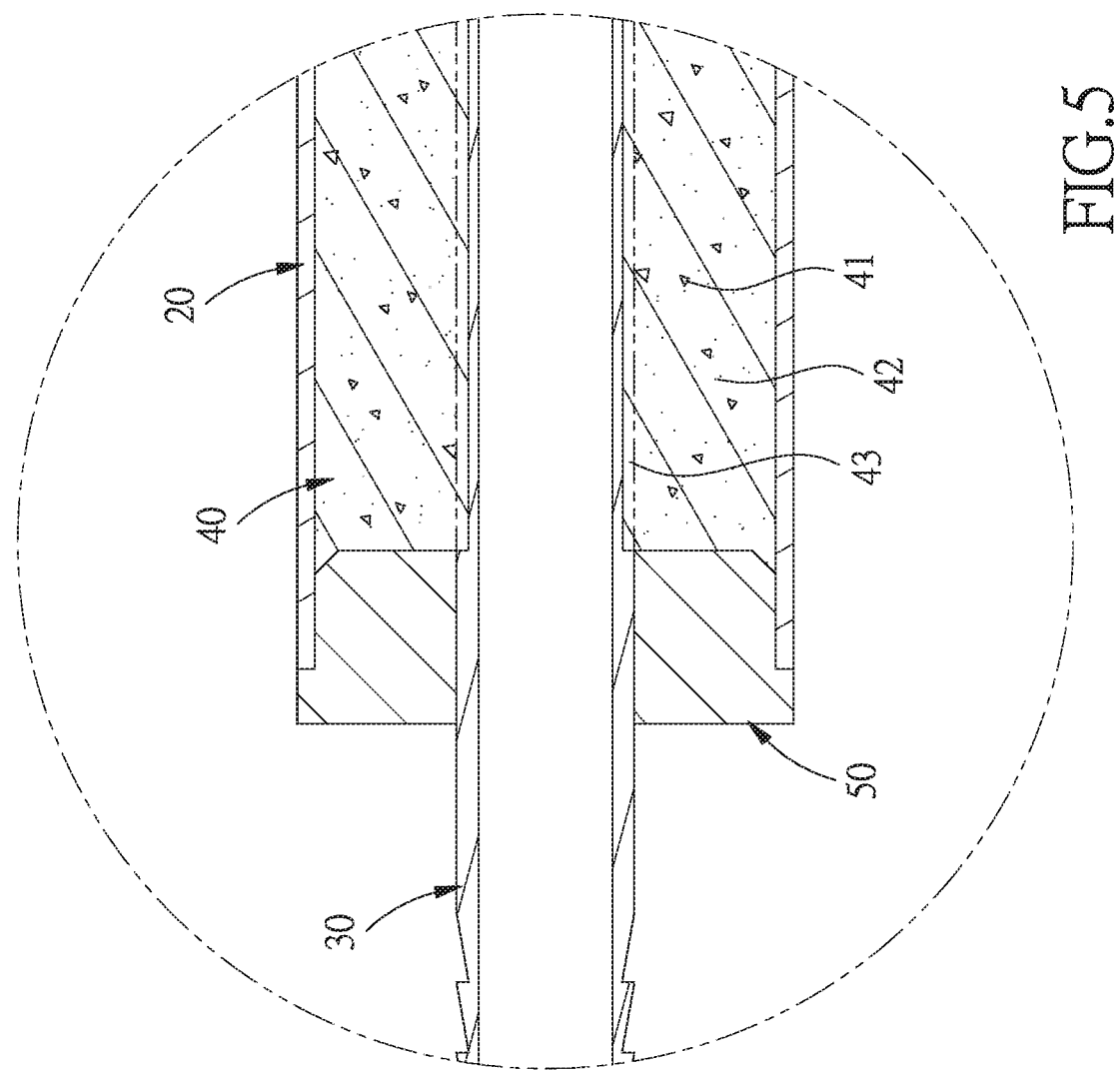
FIG. 5 is a cross sectional view of a part of the invention, showing the first reaction portion and the second reaction portion of the reaction unit.

As shown in FIGS. 3-5, the use of the environmentally friendly energy saving device 200 will be further illustrated below, when the invention is applied to a car, and the gasoline flows to the fuel channel 34 of the hollow metal inner pipe 30, the far infrared powder 41 can atomize the gasoline, and the gasoline can be evenly heated due to the fact that the hollow metal inner and outer pipes 30, 20 which are titanium plated have good thermal conductivity and can recombine the gasoline ions. The above mentioned is of a conventional art and therefore will not be further discussed.

Pressurizing the far infrared powder 41 into a block under high pressure is carried out by a machine which is invented by the inventor of this invention, and requires a total of six steps: the first step is to set the environmentally friendly energy saving device 200 on the clamping device (not shown); the second step is to close the clamping device so that the clamping device can fix the environmentally friendly energy saving device 200; the third step is to set pressure parameter, which is set in the range of 30 kg/cm$^2$ to 32 kg/cm$^2$; the fourth step is to fill the far infrared powder 41, which is about 4-5 tablespoons of powder, depending on the length of the environmentally friendly energy saving device 200; the fifth step is to activate the switch so that the compression column of the machine can move downward, thereby compressing the far infrared powder 41, and the height of the pressurized far infrared powder 41 is about 1 cm; the sixth step repeats the fourth step and the fifth step, so that the far infrared powder 41 can be filled in the receiving chamber 60 and the thinning groove 33 in the form of a block.

It is worth mentioning that the invention has the following functions:

First, the heat preservation effect is better. The far infrared powder 41 is pressurized into a block with the first reaction portion 42 and the second reaction portion 43. The block has more concentrated density than the density of the conventional unpressurized far infrared powder, so that the heat energy won't spread everywhere and will be more concentrated on the first reaction portion 42 and the second reaction portion 43. Besides, the hollow metal outer and inner pipes 20, 30 are coated with titanium, and the strength of the titanium will be strengthened after being heated due to the ductility of the pure titanium metal. In addition, the radiation heat absorption rate of titanium metal composite polymer coating is over 99%, so the hollow metal outer and inner pipes 20, 30 can effectively conduct heat. Furthermore, the far infrared ray powder 41 can improve the energy to achieve a better reaction effect.

Second, increased penetrability: the thinning of the wall of the hollow metal inner pipe 30 greatly alleviates the barrier that weakens the far infrared rays emitted by the far infrared powder 41 to make it easier for the far infrared rays emitted by the far infrared powder 41 to penetrate the fuel channel 34, allowing gasoline molecules to absorb more far infrared rays, so that the fuel can be fully mixed with air when entering the cylinder to achieve complete combustion of 100% efficiency.

Third, prevent the overly-thin pipe wall from bursting. When gasoline flows to the fuel channel 34 of the hollow metal inner pipe 30, the fuel pressure will move towards the inner wall of the hollow metal inner pipe 30. Because the fuel pressure generated by the high pressure common rail engine is too high, the wall of the hollow metal inner pipe 30, which is too thin, may burst. Therefore, the far infrared powder 41 is pressurized into a block with the first reaction portion 42 and the second reaction portion 43, the first reaction portion 42 rests against the hollow metal outer pipe 20, the second reaction portion 43 rests against the first reaction portion 42, and the thin pipe wall rests against the second reaction portion 43, so that a thick support wall is formed to support the thin pipe wall to prevent the overly-thin pipe wall from bursting under excessive fuel pressure.

Fourth, improved safety; as shown in FIG. 4, as the far infrared powder 41 is pressurized into a block with the first reaction portion 42 and the second reaction portion 43, when the invention is in use, the two ends of the thinning groove 33 are blocked by the block, as a result, the hollow metal inner pipe 30 is less likely to fall off from the hollow metal outer pipe 20, effectively enhancing safety.

While we have shown and described various embodiments in accordance with the present invention, it is clear to those skilled in the art that further embodiments may be made without departing from the scope of the present invention.

What is claimed is:

1. An environmentally friendly energy saving device, comprising:
   a hollow metal outer pipe;
   a hollow metal inner pipe inserted in the hollow metal outer pipe, and including a middle portion defining a receiving chamber with respect to the hollow metal outer pipe, two connecting portions located at two ends of the middle portion and extended out from two ends of the hollow metal outer pipe, and a thinning groove formed in the middle portion and in communication with the receiving chamber, wherein the hollow metal inner pipe includes a fuel channel running through the two connecting portions for passage of fuel;
   a reaction unit formed by filling far infrared powder into the receiving chamber and the thinning groove and pressurizing the far infrared powder into a block, wherein the reaction unit includes a first reaction portion located in the receiving chamber, and a second reaction portion located in the thinning groove, a pressure for pressurizing the far infrared powder into a block is 30 kg/cm$^2$ to 32 kg/cm$^2$; and
   two covers disposed at two ends of the hollow metal outer pipe to seal off two ends of the receiving chamber, wherein the two connecting portions of the hollow metal inner pipe extend out of the two covers, respectively.

2. The environmentally friendly energy saving device as claimed in claim 1, wherein the connecting portions take the form of annular ratchet teeth.

3. The environmentally friendly energy saving device as claimed in claim 1, wherein each of the two covers includes a circular chamfer located in the receiving chamber and adjacent to the hollow metal outer pipe.

4. The environmentally friendly energy saving device as claimed in claim 1, wherein the thinning groove has a depth between 0.2 mm and 0.5 mm.

5. The environmentally friendly energy saving device as claimed in claim 1, wherein the hollow metal outer and inner pipes are seamless stainless pipes.

* * * * *